(12) United States Patent
Adachi et al.

(10) Patent No.: US 9,010,280 B2
(45) Date of Patent: Apr. 21, 2015

(54) HOT-WATER SUPPLY SYSTEM

(75) Inventors: Ikuro Adachi, Nagoya (JP); Takeshi Kato, Nagoya (JP)

(73) Assignee: Rinnai Corporation, Nagoya-Shi (JP)

( * ) Notice: Subject to any disclaimer, the term of this patent is extended or adjusted under 35 U.S.C. 154(b) by 871 days.

(21) Appl. No.: 13/254,472

(22) PCT Filed: Mar. 10, 2010

(86) PCT No.: PCT/JP2010/054002
§ 371 (c)(1),
(2), (4) Date: Sep. 2, 2011

(87) PCT Pub. No.: WO2010/104110
PCT Pub. Date: Sep. 16, 2010

(65) Prior Publication Data
US 2011/0315091 A1  Dec. 29, 2011

(30) Foreign Application Priority Data
Mar. 11, 2009  (JP) ................................. 2009-058222

(51) Int. Cl.
| F24H 3/00 | (2006.01) |
| F24D 17/02 | (2006.01) |
| F24D 17/00 | (2006.01) |
| F24D 19/10 | (2006.01) |
| F24H 1/52 | (2006.01) |

(52) U.S. Cl.
CPC ............ *F24D 17/02* (2013.01); *F24D 17/0031* (2013.01); *F24D 17/0073* (2013.01); *F24D 19/1051* (2013.01); *F24D 19/1054* (2013.01); *F24H 1/523* (2013.01); *Y02B 30/12* (2013.01)

(58) Field of Classification Search
CPC ... F24H 4/04; F24D 17/0031; F24D 17/0073; F24D 17/02
USPC ................................................ 122/14.1, 14.3
See application file for complete search history.

(56) References Cited

U.S. PATENT DOCUMENTS

2008/0308643 A1*  12/2008  Larson et al. ................. 236/12.1

FOREIGN PATENT DOCUMENTS

| EP | 0038964 | 11/1981 | | |
| GB | 847355 | 9/1960 | | |
| JP | 2000-329401 | 11/2000 | | |
| JP | 2001-041573 | 2/2001 | | |
| JP | 2001-330312 | 11/2001 | | |
| JP | 2005-042965 | 2/2005 | | |
| JP | 2005-106330 | 4/2005 | | |
| JP | 2005106330 A | * 4/2005 | ................ | F24H 1/18 |
| JP | 2006349323 A | * 12/2006 | | |

* cited by examiner

*Primary Examiner* — Steven B McAllister
*Assistant Examiner* — Ko-Wei Lin
(74) *Attorney, Agent, or Firm* — Rankin, Hill & Clark LLP

(57) ABSTRACT

When a detection temperature by a hot-water tank thermister (42) has been equal to or lower than a re-heating determination temperature over at least a re-heating determination time, a tank controller (50) performs a sterilization process by heating hot water within a hot-water tank (31) by means of a heat pump unit (60); and when the detection temperature by the hot-water tank thermister (42) has been equal to or lower than a determination temperature for prohibiting the use of stored hot water over at least a determination time for prohibiting the use of stored hot water, the tank controller (50) performs only a temperature regulation control via heating while keeping a hot-water flow regulation valve (34) in a closed state.

6 Claims, 4 Drawing Sheets

HOT-WATER SUPPLY SYSTEM

TECHNICAL FIELD

The present invention relates to a hot-water supply system having a hot-water supply apparatus of an instantaneous heating type connected in series at a downstream side of a hot-water tank unit.

BACKGROUND ART

Hitherto, there has been known a hot-water supply system having a hot-water supply apparatus of an instantaneous heating type connected in series at a downstream side of a hot-water tank unit in which water in a hot-water tank is heated by a heat pump (for example, refer to Japanese Patent Laid-open No. 2000-329401).

When the hot-water supply apparatus is connected in series at the downstream of the hot-water tank unit, a pipeline for the hot-water to flow from the hot-water tank to a tap of a hot-water supply pipe via the hot-water supply apparatus becomes long. Accordingly, a pressure loss in the pipeline becomes great, which causes a problem that a sufficient flow of hot-water may not be available.

SUMMARY OF THE INVENTION

Problems to be Solved by the Invention

The present invention has been accomplished in view of the aforementioned problems, and it is therefore an object of the present invention to provide a hot-water supply system which is constructed by connecting a hot-water tank unit and a hot-water supply apparatus in series and is capable of reducing a pressure loss in a pipeline of water.

Means for Solving the Problems

To attain an object described above, the present invention provides a hot-water supply system comprising: a hot-water tank, a hot-water supply pipe connected to the hot-water tank, a water supply pipe connected to the hot-water tank and the hot-water supply pipe, a heating unit configured to heat the water in the hot-water tank, a water current sensor configured to detect a water current to the water supply pipe, a hot-water flow regulation valve disposed between a joint location of the hot-water supply pipe to the hot-water tank and a joint location of the hot-water supply pipe to the water supply pipe for regulating an opening degree of the hot-water supply pipe, a water flow regulation valve disposed between a joint location of the water supply pipe to the hot-water tank and a joint location of the water supply pipe to the hot-water supply pipe for regulating an opening degree of the water supply pipe, a hot-water storage temperature sensor configured to detect a temperature of the water in the hot-water tank, a hot-water supply apparatus disposed in the midway of the hot-water supply pipe at a downstream side of the joint location between the hot-water supply pipe and the water supply pipe for heating the water flowing through the hot-water supply pipe, a hot-water supply temperature setting unit configured to set a desired hot-water supply temperature, and a temperature regulation control unit configured to perform a temperature regulation control via mixing by prohibiting the heating by the hot-water supply apparatus and regulating a mixing ratio of the hot-water supplied from the hot-water tank to the hot-water supply pipe and the water supplied from the water supply pipe to the hot-water supply pipe by means of the hot-water flow regulation valve and the water flow regulation valve so as to supply the hot-water having the desired hot-water supply temperature from the hot-water supply pipe when the water current is detected by the water current sensor and the detection temperature by the hot-water storage temperature sensor is higher than a hot-water shortage determination temperature set according to the desired hot-water supply temperature, and to perform a temperature regulation control via heating by permitting the heating by the hot-water supply apparatus so as to supply the hot-water having the desired hot-water supply temperature from the hot-water supply pipe when the water current is detected by the water current sensor and the detection temperature by the hot-water storage temperature sensor is equal to or lower than the hot-water shortage determination temperature.

A first aspect of the present invention further comprises a mixing temperature sensor disposed at a downstream side close to a joint location between the hot-water supply pipe and the water supply pipe for detecting a temperature of the water supplied from the joint location to the hot-water supply pipe, and when the temperature regulation control via heating is initiated, the temperature regulation control unit regulates the mixing ratio by means of the hot-water flow regulation valve and the water flow regulation valve so as to lower a detection temperature of the mixing temperature sensor from a temperature obtained by subtracting a minimum capacity temperature which is a temperature increment of the hot-water presumed to increase when heated by the hot-water supply apparatus with the minimum capacity from the desired hot-water supply temperature by a first predefined temperature over a predefined time, and thereafter opens the hot-water flow regulation valve and the water flow regulation valve close to the maximum opening degree.

According to the present invention, when the temperature regulation control via heating is initiated, the temperature regulation control unit lowers the detection temperature of the mixing temperature sensor from a temperature obtained by subtracting the minimum capacity temperature from the desired hot-water supply temperature by the first predefined temperature over the predefined time, and thereafter opens the hot-water flow regulation valve and the water flow regulation valve close to the maximum opening degree. According thereto, it is possible to inhibit the temperature of the hot-water supplied to the hot-water supply apparatus from decreasing abruptly so as to prevent the temperature fluctuation of the hot-water supplied from the hot-water supply apparatus, and it is also possible to reduce the pressure loss in the pipeline of the hot-water by opening the hot-water flow regulation valve and the water flow regulation valve close to the maximum opening degree.

In the first aspect of the present invention, the predefined time is defined as a time interval in which the hot-water supply system is capable of supplying the hot-water having the desired hot-water supply temperature from the hot-water supply apparatus by increasing a heating capacity of the hot-water supply apparatus following the lowering of the detection temperature of the mixing temperature sensor by the first predefined temperature.

According to the present invention, since the heating capacity of the hot-water supply apparatus can be increased when the detection temperature by the mixing temperature sensor is lowered by the first predefined temperature, it is more certain to inhibit the temperature of the hot-water supplied from the hot-water supply apparatus from decreasing lower than the desired hot-water supply temperature.

A second aspect of the present invention further comprises a mixing temperature sensor disposed at a downstream side close to a joint location between the hot-water supply pipe and the water supply pipe for detecting a temperature of the hot-water supplied from the joint location to the hot-water supply pipe, when the detection temperature by the hot-water storage temperature sensor is higher than a hot-water complete shortage determination temperature set lower than the hot-water shortage determination temperature in the temperature regulation control via heating, the temperature regulation control unit regulates the mixing ratio by means of the hot-water flow regulation valve and the water flow regulation valve so as to make a detection temperature of the mixing temperature sensor equal to a temperature obtained by subtracting a minimum capacity temperature which is a temperature increment of the hot-water presumed to increase when heated by the hot-water supply apparatus with the minimum capacity from the desired hot-water supply temperature; and when the detection temperature by the hot-water storage temperature sensor is equal to or lower than the hot-water complete shortage determination temperature, the temperature regulation control unit opens the hot-water flow regulation valve and the water flow regulation valve close to the maximum opening degree.

According to the present invention, when the temperature of the hot-water in the hot-water tank is higher than the hot-water complete shortage determination temperature, by regulating the mixing ratio so as to make the detection temperature of the mixing temperature sensor equal to the temperature obtained by subtracting a minimum capacity temperature from the desired hot-water supply temperature, it is possible to inhibit the heating capacity by the hot-water supply apparatus so as to supply the hot-water efficiently. When the temperature of the hot-water in the hot-water tank further decreases to be equal to or lower than the hot-water complete shortage determination temperature, by opening the hot-water flow regulation valve and the water flow regulation valve close to the maximum opening degree, it is possible to reduce the pressure loss in the pipeline of the water.

In the second aspect of the present invention, the hot-water supply system is further provided with an inflow water temperature sensor for detecting a temperature of water supplied from the water supply pipe to the hot-water supply pipe, and the hot-water complete shortage determination temperature is defined as a temperature higher than a detection temperature by the inflow water temperature sensor or a temperature higher than the detection temperature by a second predefined temperature.

According to the present invention, when a temperature difference between the temperature of the water in the hot-water tank and the temperature of water supplied to the water supply pipe becomes smaller, the hot-water flow regulation valve and the water flow regulation valve are opened close to the maximum opening degree. According thereto, it is possible to inhibit the decrement of flow of the water supplied to the hot-water supply apparatus due to the pressure loss, which makes it possible to perform the temperature regulation control via heating.

In the first aspect and the second aspect of the present invention, the hot-water supply apparatus is provided with a heat exchanger disposed in the midway of the hot-water supply pipe, a hot-water bypass pipe bypassing the heat exchanger to communicate the hot-water supply pipe at a upstream side and a downstream side of the heat exchanger, and a bypass regulation valve regulating the opening degree of the hot-water bypass pipe; and the temperature regulation control unit opens the bypass regulation valve close to the maximum opening degree when the temperature regulation control via mixing is being performed.

According to the present invention, when the temperature regulation control via mixing is being performed, by opening the bypass regulation valve of the hot-water supply apparatus close to the maximum opening degree, it is possible to reduce the pressure loss when the hot-water flows through the hot-water supply apparatus so as to increase the available flow amount of the hot-water.

MODE FOR CARRYING OUT THE INVENTION

Figure 1:
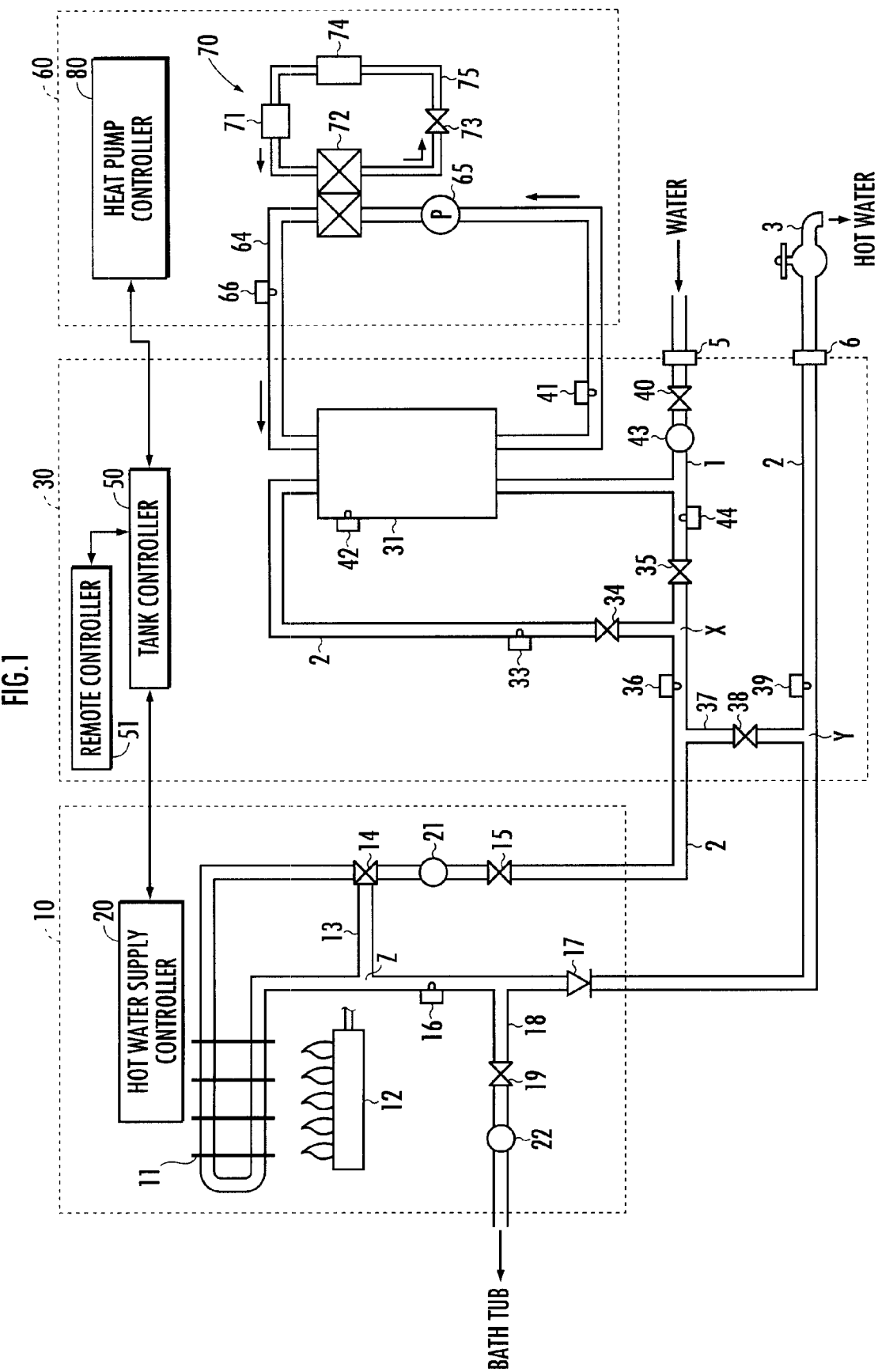
FIG. 1 is a structural diagram of a hot-water supply system of the present invention.

Hereinafter, an embodiment of the present invention will be described in detail with reference to FIG. 1 to FIG. 4. As illustrated in FIG. 1, a hot-water supply system according to the present embodiment is composed of a hot-water supply apparatus of an instant heating type 10, a tank unit 30, and a heat pump unit 60 (equivalent to a heating unit of the present invention).

The heat pump unit 60 is composed of a heat pump 70 (equivalent to the heating unit of the present invention) having a compressor 71, a condenser 72, a decompressor 73, and a vaporizer 74 which are connected by a refrigerant circulating path 75. The condenser 72 is connected with a tank circulating path 64 connecting an upper portion and a lower portion of a hot-water tank 31 and is configured to heat water in the tank circulating path 64 according to heat exchange between the refrigerant in the refrigerant circulating path 75 and the water in the tank circulating path 64.

The tank circulating path 64 is disposed with a circulating pump 65 for circulating the water stored in the hot-water tank 31 in the tank circulating path 64, an outflow thermister 66 for detecting a temperature of the water supplied from the condenser 72 to the hot-water tank 31, and an inflow thermister 41 for detecting a temperature of the water supplied from the hot-water tank 31 to the condenser 72.

The signal of the temperature detected by the outflow thermister 66 is input to a heat pump controller 80 which is an electronic unit composed of a micro computer and the like. According to a control signal output from the heat pump controller 80, operations of the heat pump 70 and the circulating pump 65 are controlled.

The heat pump controller 80 is communicably connected with a tank controller 50. If an instruction signal for heating the hot-water in the tank is received from the tank controller 50, the heat pump controller 80 activates the circulating pump 65 and the heat pump 70 on the basis of the detection temperature by the outflow thermister 66, the detection temperature by the inflow thermister 41 and an upper temperature limit of the hot-water in the tank by using the data of the upper temperature limit of the hot-water in the tank and the detection temperature of the inflow thermister 41 transmitted from the tank controller 50 to heat the water in the hot-water tank 31 to the upper temperature limit of the hot-water in the tank.

The tank unit 30 is composed of the hot-water tank 31, a hot-water supply pipe 2 connected to the upper portion of the hot-water tank 31, a water supply pipe 1 connected to both the lower portion of the hot-water tank 31 and the hot-water supply pipe 2, a hot-water bypass pipe 37 bypassing the hot-water supply apparatus 10 to communicate the upstream side and the downstream side of the hot-water supply apparatus 10.

The tank unit 30 is provided with the inflow thermister 41 for detecting the temperature of water supplied from the hot-water tank 31 to the heat pump unit 60, a hot-water tank thermister 42 (equivalent to a hot-water storage temperature sensor of the present invention) for detecting the temperature of water stored in the hot-water tank 31, an inflow hot-water thermister 33 disposed at an upstream side close to a joint location X between the water supply pipe 1 and the hot-water supply pipe 2, a tank water flow sensor 43 (equivalent to a water current sensor of the present invention) for detecting a flow of the water current in the water supply pipe 1, an inflow water thermister 44 (equivalent to an inflow water temperature sensor of the present invention) disposed in the water supply pipe 1, a hot-water flow regulation valve 34 for regulating a flow of water supplied from the hot-water tank 31 to the hot-water supply pipe 2, a water flow regulation valve 35 for regulating a flow of water supplied from the water supply pipe 1 to the hot-water supply pipe 2, a pressure reducing valve 40 with a check valve disposed in the water supply pipe 1, a mixing thermister 36 (equivalent to a mixing temperature sensor of the present invention) disposed between the joint location X of the water supply pipe 1 to the hot-water supply pipe 2 and a location where the hot-water bypass pipe 37 is disposed, a bypass valve 38 for closing or opening the hot-water bypass pipe 37, a hot-water tap thermister 39 for detecting the temperature of water supplied to the downstream side of a joint location Y between the hot-water bypass pipe 37 and the hot-water supply pipe 2.

The detection signals of temperature by the hot-water tank thermister 42, the inflow hot-water thermister 33, the inflow water thermister 44, the mixing thermister 36, the hot-water tap thermister 39 and the inflow thermister 41, and the detection signals of the water flow in the water supply pipe 1 by the tank water flow sensor 43 are input into the tank controller 50 which is an electronic unit composed of a micro computer and the like. Thereafter, the hot-water flow regulation valve 34, the water flow regulation valve 35 and the bypass valve 38 are controlled according to control signals output from the tank controller 50.

The tank controller 50 monitors the detection temperature of the hot-water tank thermister 42, and transmits the instruction signals for heating the hot-water in the tank to the heat pump controller 80 when the detection temperature of the hot-water tank thermister 42 becomes equal to or lower than a predefined lower temperature limit of the hot-water in the tank. Accordingly, the water in the hot-water tank 31 is heated to the upper temperature limit of the hot-water by the heat pump unit 60.

The tank controller 50 is connected with a remote controller 51 (having functions of a hot-water supply temperature setting unit configured to set a desired hot-water supply temperature of the present invention) including a temperature switcher (not shown) for setting a desired hot-water supply temperature (predefined hot-water supply temperature: the temperature of hot-water supplied from a tap of the hot-water supply pipe 2) and a bath temperature (predefined bath temperature: the temperature of hot-water supplied to a bath tub via a hot-water accumulation pipe 18 to be described hereinafter), a mode switcher (not shown) for switching a normal hot-water supply mode (where a hot-water accumulation valve 19 is closed so as to supply the hot-water from the tap of the hot-water supply pipe 2, which will be described hereinafter) and a hot-water accumulation mode (where the hot-water accumulation valve 19 is opened so as to supply the hot-water from the hot-water accumulation pipe 18 to the bath tub) and the like.

The hot-water supply pipe 2 is connected to an upper portion of the hot-water tank 31, and the water supply pipe 1 is connected to a lower portion of the hot-water tank 31. Thus, when the water is supplied by flowing from the hot-water tank 31 out to the hot-water supply pipe 2, the water is supplied by flowing from the water supply pipe 1 into the lower portion of the hot-water tank 31 accordingly. Thereby, a layer of hot-water of a high temperature is formed in the upper portion of the hot-water tank 31 and a layer of water is formed in the lower portion thereof. As the hot-water is being supplied from the hot-water tank 31, the layer of hot-water of a high temperature decreases, which leads to a hot-water shortage state in which the detection temperature by the hot-water tank thermister 42 becomes equal to or lower than the desired hot-water supply temperature set through the remote controller 51 (the desired hot-water supply temperature is referred to as the predefined hot-water supply temperature set through the remote controller 51 in the normal hot-water supply mode and as the predefined bath temperature set through the remote controller 51 in the hot-water accumulation mode).

The determination of whether or not the hot-water tank 31 is in the hot-water shortage state may be performed in such a way that if the detection temperature by the hot-water tank thermister 42 is equal to or lower than a hot-water shortage determination temperature set around the desired hot-water supply temperature, then the hot-water tank 31 is determined to be in the hot-water shortage state. In the present embodiment, the desired hot-water supply temperature is set equal to the hot-water shortage determination temperature.

When the detection temperature by the hot-water tank thermister 42 is higher than the desired hot-water supply temperature (not in the hot-water shortage state), and the water current is detected to have a flow equal to or greater than a predefined lower flow limit by the tank water flow sensor 43, the tank controller 50 performs a temperature regulation control via mixing for controlling the opening degrees of the hot-water flow regulation valve 34 and the water flow regulation valve 35 so as to make the detection temperature of the mixing thermister 36 or the hot-water tap thermister 39 equal to a desired temperature. Specifically, the tank controller 50 opens the bypass valve 38 in the normal hot-water supply mode and closes the bypass valve 38 in the hot-water accumulation mode.

On the other hand, when the detection temperature by the hot-water tank thermister 42 is equal to or lower than the desired hot-water supply temperature (in the hot-water shortage state) and the water current is detected to have a flow equal to or greater than the lower flow limit by the tank water flow sensor 43, the tank controller 50 closes the bypass valve 38 to supply the whole water from the hot-water tank 31 and the water supply pipe 1 to the hot-water supply apparatus 10. Here, in the hot-water supply apparatus 10, a temperature regulation control via heating is performed, which will be described hereinafter.

The hot-water supply apparatus 10 is composed of a heat exchanger 11 disposed in the midway of the hot-water supply pipe 2, a burner 12 for heating the heat exchanger 11, a hot-water bypass pipe 13 bypassing the heat exchanger 11 to communicate the hot-water supply pipe 2 at the upstream side and the downstream side of the heat exchanger 11, and the hot-water accumulation pipe 18 connecting the bath tub (not shown) with the hot-water supply pipe 2 at a downstream side of a joint location Z between the hot-water supply pipe 2 and the hot-water bypass pipe 13.

The hot-water supply pipe 2 is disposed with a bypass servo valve 14 (equivalent to a bypass regulation valve of the present invention) for regulating the opening degree of the hot-water bypass pipe 13, a water flow servo 15 for regulating the flow of the water supplied to the hot-water supply apparatus 10, a hot-water flow sensor 21 for detecting the flow of the hot-water supplied to the heat exchanger 11 and the hot-water bypass pipe 13, a thermister 16 of the hot-water supply apparatus for detecting the temperature of the water supplied to the downstream side of the joint location Z between the hot-water supply pipe 2 and the hot-water bypass pipe 13, and a check valve 17. The hot-water accumulation pipe 18 is disposed with a hot-water flow accumulation sensor 22 for detecting the flow of the hot-water in the hot-water accumulation pipe 18 and the hot-water accumulation valve 19 for opening or closing the hot-water accumulation pipe 18.

Detection signals of temperature by the thermister 16, detection signals of hot-water flow by the hot-water flow sensor 21, and detection signals of hot-water flow by the hot-water flow accumulation sensor 22 are input into a hot-water supply controller 20 which is an electronic unit composed of a micro computer and the like. Thereafter, the bypass servo valve 14, the water flow servo 15, the burner 12 and the hot-water accumulation valve 19 are controlled according to control signals output from the hot-water supply controller 20.

The hot-water supply controller 20 is communicably connected with the tank controller 50, and goes into a heating permitted state if an instruction signal for permitting heating is received from the tank controller 50. When the hot-water current is detected to have a flow equal to or greater than a predefined lower flow limit by the hot-water flow sensor 21, the hot-water supply controller 20 performs the temperature regulation control via heating for controlling the combustion amount of the burner 12 so as to make the detection temperature of the thermister 16 equal to a desired hot-water supply temperature. On the other hand, if an instruction signal for prohibiting heating is received from the tank controller 50, the hot-water supply controller 20 goes into a heating prohibited state to prohibit the temperature regulation control via heating from being performed.

When a hot-water accumulating operation (hot-water accumulation mode) is performed to supply a predefined amount of hot-water to the bath tub (not shown), the hot-water supply controller 20 opens the hot-water accumulation valve 19 to accumulate in the bath tub the hot-water to be detected by the hot-water flow accumulation sensor 22. After the accumulated amount of hot-water in the bath tub reaches the predefined amount, the hot-water accumulation valve 19 is closed to terminate the hot-water accumulating operation.

Figure 3:
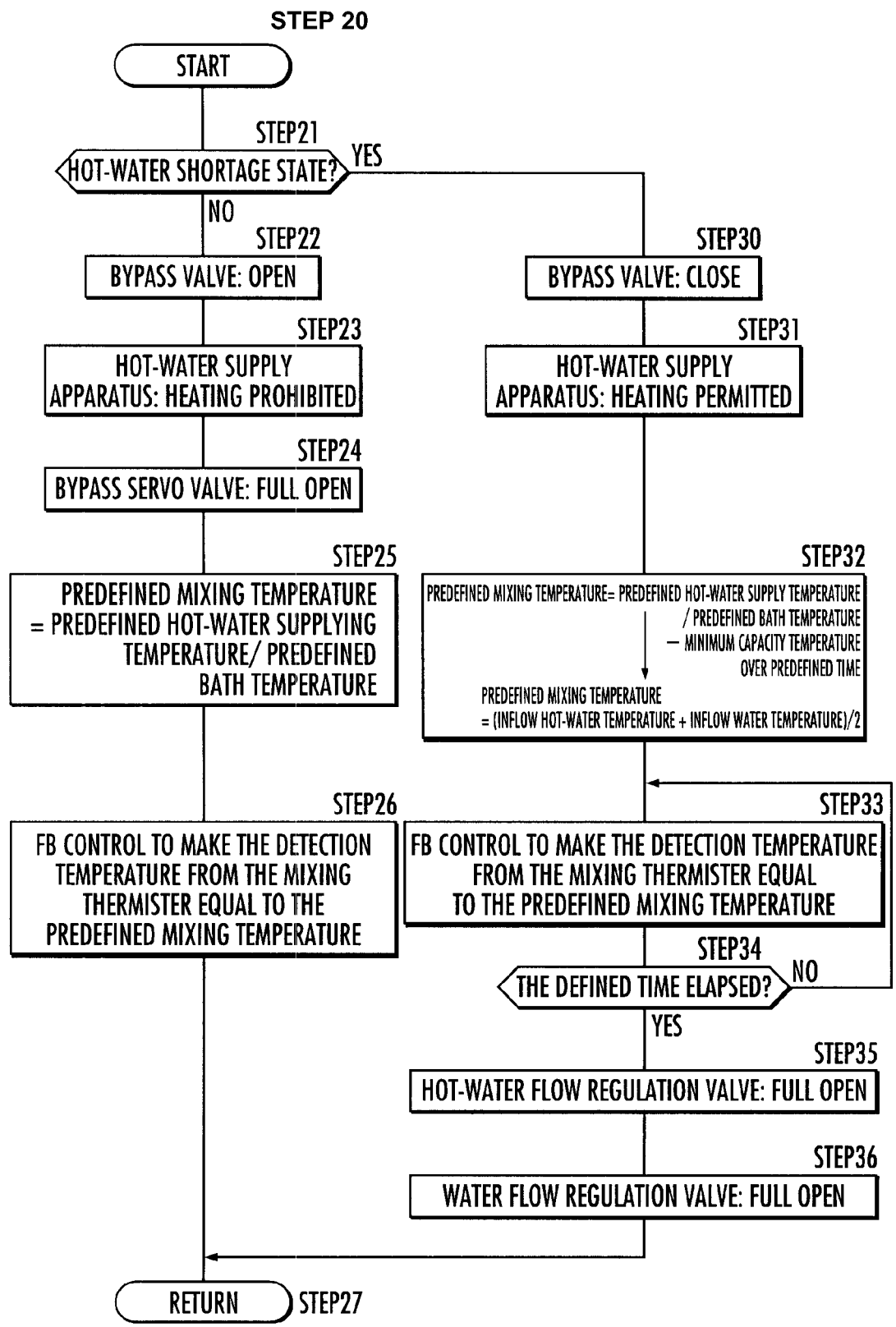
FIG. 3 is a flow chart illustrating an operation of the tank unit illustrated in FIG. 1 according to a first embodiment of the present invention.
Figure 4:
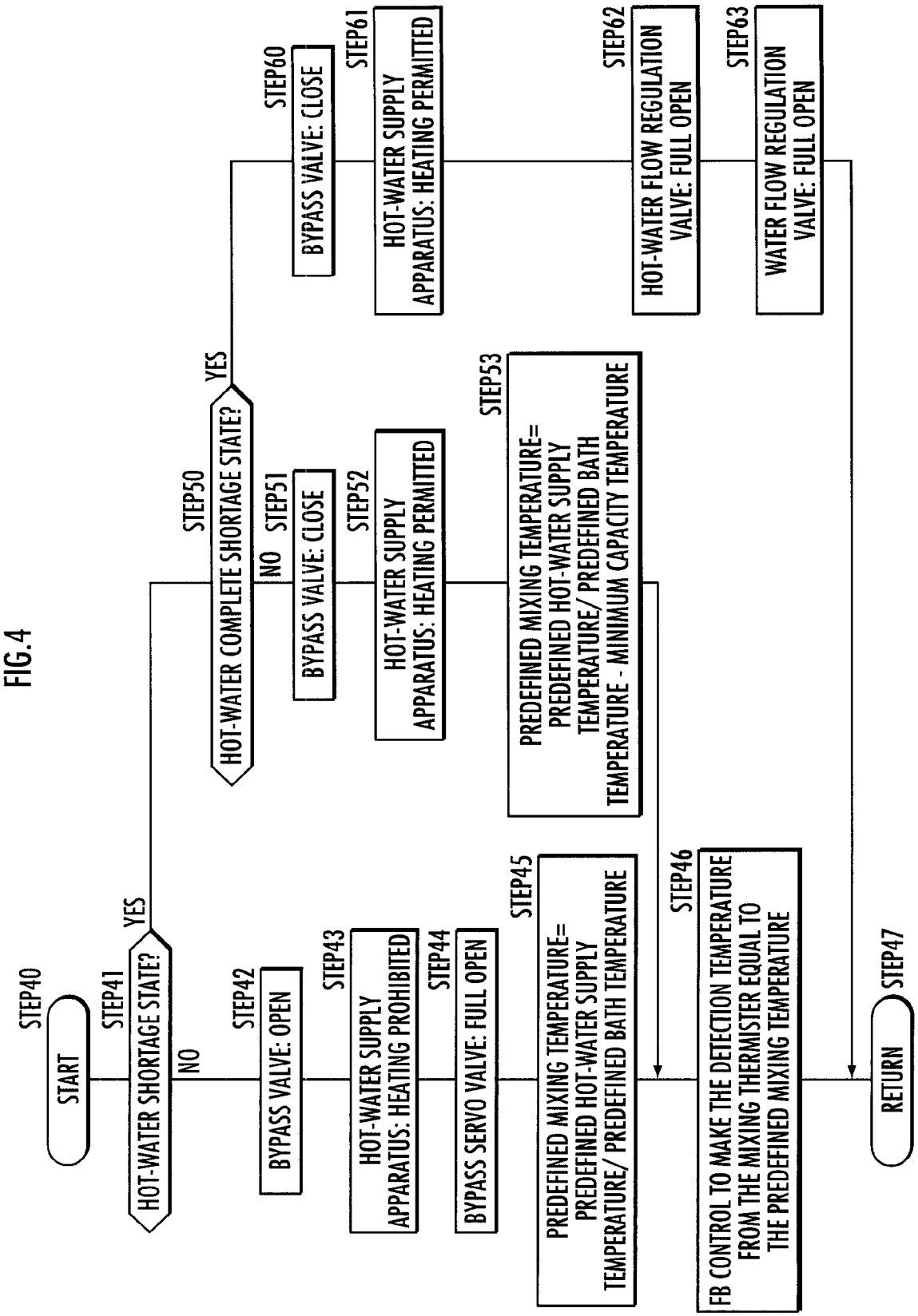
FIG. 4 is a flow chart illustrating an operation of the tank unit illustrated in FIG. 1 according to a second embodiment of the present invention.

Hereinafter, with reference to the flow charts illustrated in FIG. 2 to FIG. 4, the operation of the tank controller 50 will be described.

Figure 2:
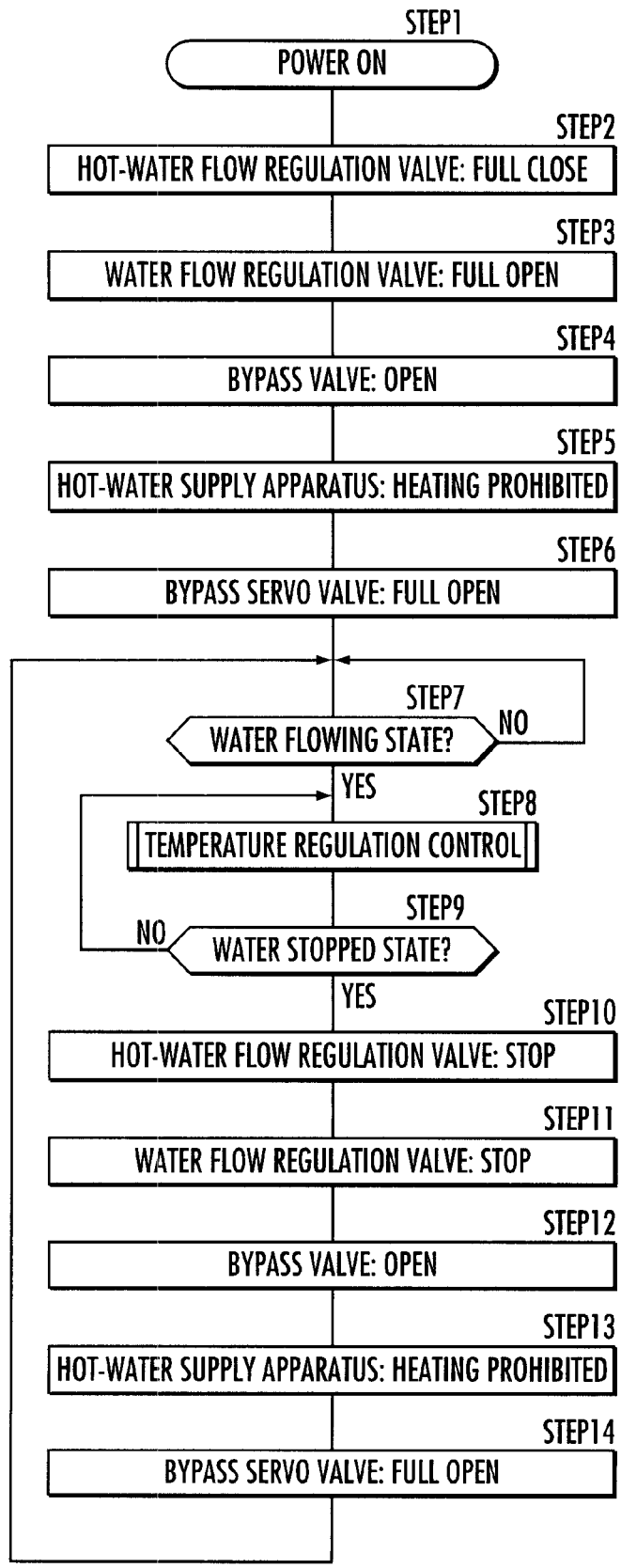
FIG. 2 is a flow chart illustrating an operation of a tank unit illustrated in FIG. 1.

When the power of the tank unit 30 is turned on in STEP 1 of FIG. 2, the process proceeds to STEP 2 where the tank controller 50 fully closes the hot-water flow regulation valve 34, and in the subsequent STEP 3, the tank controller 50 fully opens the water flow regulation valve 35. In the next STEP 4, the tank controller 50 opens the bypass valve 38. In STEP 5, the tank controller 50 transmits an instruction signal for prohibiting heating to the hot-water supply controller 20, and consequently, the temperature regulation control via heating performed by the hot-water supply apparatus 10 is prohibited. In the subsequent STEP 6, the tank controller 50 transmits an instruction signal for fully opening the bypass servo valve 14 to the hot-water supply controller 20, and consequently, the bypass servo valve 14 becomes fully opened.

In STEP 7, the tank controller 50 stands by until the presence of a water flowing state in which a water current having at least a lower flow limit is detected by the tank water flow sensor 43. If the water current is in the water flowing state, the process proceeds from STEP 7 to STEP 8 where the tank controller 50 repeats a sub-routine of the temperature regulation control of STEP 8 until a water stopped state in which the water current having at least the lower flow limit is not detected by the tank water flow sensor 43.

If the water current is in the water stopped state in STEP 9, the process proceeds to STEP 10 where the tank controller 50 stops the hot-water flow regulation valve 34 (maintains the opening degree thereof at the time). The tank controller 50 stops the water flow regulation valve 35 (maintains the opening degree thereof at the time) in STEP 11, opens the bypass valve 38 in the next STEP 12, and transmits the instruction signal for prohibiting heating to the hot-water supply controller 20 in STEP 13.

In STEP 14, the tank controller 50 transmits an instruction signal for fully opening the bypass servo valve 14 to the hot-water supply controller 20, and then the process returns to STEP 7. The configuration for performing the sub-routine of the temperature regulation control in STEP 8 is equivalent to the temperature regulation control unit of the present invention.

First Embodiment of the Temperature Regulation Control

Hereinafter, with reference to FIG. 3, a first embodiment of the sub-routine of the temperature regulation control in STEP 8 of FIG. 2 will be described. The process from STEP 20 to STEP 27 and from STEP 30 to STEP 36 in FIG. 3 is equivalent to the sub-routine of the temperature regulation control in STEP 8 of FIG. 2.

In STEP 21, the tank controller 50 determines whether or not the hot-water tank 31 is in a hot-water shortage state (in which the detection temperature by the hot-water tank thermister 42 is equal to or lower than the predefined hot-water supply temperature in the normal hot-water supply mode, or the detection temperature by the hot-water tank thermister 42 is equal to or lower than the predefined bath temperature in the hot-water accumulation mode). If it is determined that the hot-water tank 31 is in the hot-water shortage state, the process branches to STEP 30; if the hot-water tank 31 is not in the hot-water shortage state, the process proceeds to STEP 22.

The process from STEP 22 to STEP 26 is the process for performing the temperature regulation control via mixing. The tank controller 50 opens the bypass valve 38 in STEP 22, and transmits the instruction signal for prohibiting heating to the hot-water supply controller 20 in the subsequent STEP 23. In the next STEP 24, the tank controller 50 transmits the instruction signal for fully opening the bypass servo valve 14 to the hot-water supply controller 20. According thereto, the heating by the hot-water supply apparatus 10 is prohibited, and meanwhile the bypass servo valve 14 of the hot-water supply apparatus 10 is fully opened.

Therefore, by fully opening the bypass servo valve 14, it is possible to reduce the pressure loss of the water flowing through the hot-water supply apparatus 10. However, it is not essential to fully open the bypass servo valve 14; by opening the bypass servo valve 14 close to the full open position, it is possible to attain the effect of reducing the pressure loss.

In the next STEP 25, the tank controller 50 sets the defined hot-water supply temperature as the predefined mixing temperature in the normal hot-water supply mode and sets the defined bath temperature as the predefined mixing temperature in the hot-water accumulation mode. In STEP 26, the tank controller 50 performs a FB (Feedback) control on a mixing ratio between the hot-water supplied from the hot-water tank 31 to the hot-water supply pipe 2 and the water supplied from the water supply pipe 1 to the hot-water supply pipe 2 by regulating the opening degrees of the hot-water flow regulation valve 34 and the water flow regulation valve 35 so as to make the detection temperature by the mixing thermister 36 equal to the predefined mixing temperature. Thereafter, the process proceeds to STEP 27 where the tank controller 50 terminates the process of the temperature regulation control and returns to STEP 9 of FIG. 2.

The process from STEP 30 to STEP 36 is the process of performing the temperature regulation control via heating. The tank controller 50 closes the bypass valve 38 in STEP 30, and transmits the instruction signal for permitting heating to the hot-water supply controller 20 in the subsequent STEP 31.

According thereto, on the side of the hot-water supply apparatus 10, the hot-water supply controller 20 controls the combustion amount of the burner 12 and the opening degree of the bypass servo valve 14 so as to make the detection temperature by the thermister 16 equal to the desired hot-water supply temperature (referred to as the predefined hot-water supply temperature in the normal hot-water supply mode or the predefined bath temperature in the hot-water accumulation mode).

In the subsequent STEP 32, the tank controller 50 first sets the predefined mixing temperature according to the following expression (1).

[Expression 1]

$$\text{Predefined mixing temperature} = \text{Desired hot-water supply temperature} - \text{Minimum capacity temperature} \quad (1)$$

Wherein, the desired hot-water supply temperature: the predefined hot-water supply temperature in the normal hot-water supply mode or the predefined bath temperature in the hot-water accumulation mode; and the minimum capacity temperature: temperature increment of the water in the present flow (the present flow of the water current detected by the hot-water flow sensor 21) when heated by the hot-water supply apparatus 10 with the minimum capacity.

Thereafter, the tank controller 50 lowers the predefined mixing temperature calculated according to the above expression (1) to a predefined mixing temperature calculated according to the following expression (2) over a predefined time.

[Expression 2]

$$\text{predefined mixing temperature} = (\text{inflow hot-water temperature} + \text{inflow water temperature})/2 \quad (2)$$

Wherein, inflow hot-water temperature: detection temperature by the inflow hot-water thermister 33 or the hot-water tank thermister 42; and inflow water temperature: detection temperature by the inflow water thermister 44. The difference between the predefined mixing temperature calculated according to the above expression (1) and the predefined mixing temperature calculated according to the above expression (2) is equivalent to a first predefined temperature of the present invention.

In the subsequent STEP 33 and STEP 34, the tank controller 50 performs the FB (Feedback) control on the mixing ratio between the hot-water supplied from the hot-water tank 31 to the hot-water supply pipe 2 and the water supplied from the water supply pipe 1 to the hot-water supply pipe 2 by regulating the opening degrees of the hot-water flow regulation valve 34 and the water flow regulation valve 35 so as to make the detection temperature by the mixing thermister 36 equal to the predefined mixing temperature in STEP 33 until the predefined time is elapsed in STEP 34.

The predefined time in STEP 32 and STEP 34 is defined as a time interval in which the heating capacity of the hot-water supply apparatus 10 is increased following the lowering of the predefined mixing temperature to maintain the hot-water supply at the desired hot-water supply temperature.

It is possible to lower the temperature of the hot-water supplied from the joint location X between the hot-water supply pipe 2 and the water supply pipe 1 to the predefined mixing temperature set according to the above expression (2) while inhibiting the temperature of the hot-water supplied from the hot-water supply apparatus 10 to the hot-water supply pipe 2 from getting lower than the desired hot-water supply temperature.

After the predefined time is elapsed in STEP 34, the process proceeds to STEP 35 where the tank controller 50 fully opens the hot-water flow regulation valve 34, and fully opens the water flow regulation valve 35 in the subsequent STEP 36. Thereby, the pressure loss due to the hot-water flow regulation valve 34 and the water flow regulation valve 35 is reduced, preventing the hot-water flow from becoming insufficient. Thereafter, the process proceeds to STEP 27 where the tank controller 50 terminates the temperature regulation control process and proceeds to STEP 9 of FIG. 2.

Second Embodiment of the Temperature Regulation Control

Hereinafter, with reference to FIG. 4, a second embodiment of the sub-routine of the temperature regulation control in STEP 8 of FIG. 2 will be described. The process from STEP 40 to STEP 47, from STEP 50 to STEP 52 and from STEP 60 to STEP 63 in FIG. 4 is equivalent to the sub-routine of the temperature regulation control in STEP 8 of FIG. 2.

In STEP 41, the tank controller 50 determines whether or not the hot-water tank 31 is in a hot-water shortage state (in which the detection temperature by the hot-water tank thermister 42 is equal to or lower than the predefined hot-water supply temperature in the normal hot-water supply mode, or the detection temperature by the hot-water tank thermister 42 is equal to or lower than the predefined bath temperature in the hot-water accumulation mode). If it is determined that the hot-water tank 31 is in the hot-water shortage state, the process branches to STEP 50; if the hot-water tank 31 is not in the hot-water shortage state, the process proceeds to STEP 42.

The process from STEP 42 to STEP 46 is the process for performing the temperature regulation control via mixing. Similar to the process of STEP 22 to STEP 26 in FIG. 3 in the above-mentioned first embodiment, the tank controller 50 opens the bypass valve 38 in STEP 42, and transmits the instruction signal for prohibiting heating to the hot-water supply controller 20 in the subsequent STEP 43.

In the next STEP 44, the tank controller 50 transmits the instruction signal for fully opening the bypass servo valve 14 to the hot-water supply controller 20. According thereto, the heating by the hot-water supply apparatus 10 is prohibited, and meanwhile the bypass servo valve 14 of the hot-water supply apparatus 10 is fully opened.

In the next STEP 45, the tank controller 50 sets the defined hot-water supply temperature as the predefined mixing temperature in the normal hot-water supply mode and sets the defined bath temperature as the predefined mixing temperature in the hot-water accumulation mode. In STEP 46, the tank controller 50 performs a FB (Feedback) control on a mixing ratio between the hot-water supplied from the hot-water tank 31 to the hot-water supply pipe 2 and the water supplied from the water supply pipe 1 to the hot-water supply pipe 2 by regulating the opening degrees of the hot-water flow regulation valve 34 and the water flow regulation valve 35 so as to make the detection temperature by the mixing thermister 36 equal to the predefined mixing temperature. Thereafter, the process proceeds to STEP 47 where the tank controller 50 terminates the process of the temperature regulation control and returns to STEP 9 of FIG. 2.

The process from STEP 50 to STEP 52 and from STEP 60 to STEP 63 are related to the process of performing the temperature regulation control via heating. In STEP 50, the tank controller 50 determines whether or not the hot-water tank 31 is in a hot-water complete shortage state in which the detection temperature by the hot-water tank thermister 42 is equal to or lower than a hot-water complete shortage determination temperature. If it is determined that the hot-water tank 31 is in the hot-water complete shortage state, the process branches to STEP 60; if the hot-water tank 31 is not in the hot-water complete shortage state, the process proceeds to STEP 51.

In the present embodiment, the hot-water complete shortage determination temperature is defined as the detection temperature by the hot-water tank thermister 42. However, it is acceptable to set the hot-water complete shortage determination temperature slightly higher than the detection temperature by the inflow water thermister 44. In this case, the temperature difference between the hot-water complete shortage determination temperature and the detection temperature by the inflow water thermister 44 is equivalent to the second predefined temperature of the present invention.

The process from STEP 51 and STEP 52 are related to the process in the situation where the hot-water tank 31 is in the hot-water shortage state but has not yet led to the hot-water complete shortage state (the detection temperature by the hot-water tank thermister 42 is higher than the hot-water complete shortage determination temperature but equal to or lower than the hot-water shortage determination temperature).

The tank controller 50 closes the bypass valve 38 in STEP 51 and transmits the instruction signal for permitting heating to the hot-water supply controller 20 in STEP 52. According thereto, all the hot-water from the joint location X between the hot-water supply pipe 2 and the water supply pipe 1 is supplied to the hot-water supply apparatus 10; and the combustion amount of the burner 12 and the opening degree of the bypass servo valve 14 are controlled (the temperature regulation control via heating) so as to make the detection temperature by the thermister 16 equal to the desired hot-water supply temperature (referred to as the predefined hot-water supply temperature in the normal hot-water supply mode or the predefined bath temperature in the hot-water accumulation mode).

In the next STEP 53, the tank controller 50 sets the predefined mixing temperature defined according to the above expression (1) and the process proceeds to STEP 46. In STEP 46, the tank controller 50 performs the FB (Feedback) control on a mixing ratio between the hot-water supplied from the hot-water tank 31 to the hot-water supply pipe 2 and the water supplied from the water supply pipe 1 to the hot-water supply pipe 2 by regulating the opening degrees of the hot-water flow regulation valve 34 and the water flow regulation valve 35 so as to make the detection temperature by the mixing thermister 36 equal to the predefined mixing temperature. Thereafter, the process proceeds to STEP 47 where the tank controller 50 terminates the process of the temperature regulation control and returns to STEP 9 of FIG. 2.

The process from STEP 60 to STEP 63 are related to the process in the situation where the hot-water tank 31 is in the hot-water complete shortage state (the detection temperature by the hot-water tank thermister 42 is equal to or lower than the hot-water shortage determination temperature).

The tank controller 50 closes the bypass valve 38 in STEP 60 and transmits the instruction signal for permitting heating to the hot-water supply controller 20 in STEP 61. According thereto, all the water from the joint location X between the hot-water supply pipe 2 and the water supply pipe 1 is supplied to the hot-water supply apparatus 10; and the combustion amount of the burner 12 and the opening degree of the bypass servo valve 14 are controlled (the temperature regulation control via heating) so as to make the detection temperature by the thermister 16 equal to the desired hot-water supply temperature (referred to as the predefined hot-water supply temperature in the normal hot-water supply mode or the predefined bath temperature in the hot-water accumulation mode).

In the next STEP 62, the tank controller 50 fully opens the hot-water flow regulation valve 34, and fully opens the water flow regulation valve 35 in the subsequent STEP 63. Thereby, the pressure loss due to the hot-water flow regulation valve 34 and the water flow regulation valve 35 is reduced, preventing the hot-water flow from becoming insufficient. Thereafter, the process proceeds to STEP 47 where the tank controller 50 terminates the temperature regulation control process and proceeds to STEP 9 of FIG. 2.

In the second embodiment, when the hot-water tank 31 is determined to be in the hot-water shortage state in STEP 41, through the setting of the predefined mixing temperature in STEP 53 at first and then the control of the mixing ratio between the hot-water supplied from the hot-water tank 31 to the hot-water supply pipe 2 and the water supplied from the water supply pipe 1 to the hot-water supply pipe 2, it is possible to inhibit the heating capacity of the hot-water supply apparatus 10 so as to supply the hot-water efficiently.

Thereafter, when the hot-water tank 31 is determined to be in the hot-water complete shortage state in STEP 50 and thereby the temperature rise by the hot-water from the hot-water tank 31 is not available, by fully opening the hot-water flow regulation valve 34 in STEP 62, and by fully opening the water flow regulation valve 35 in STEP 63, it is possible to reduce the pressure loss for the hot-water supply apparatus to perform the temperature regulation control via heating.

In the present embodiment, it is described that the hot-water supply system is provided with the hot-water bypass pipe 37 for bypassing the hot-water supply apparatus 10 and the bypass valve 38 for closing or opening the hot-water bypass pipe 37; however, it is possible to apply the present invention to a hot-water supply system without a hot-water bypass pipe and a bypass valve for closing or opening the hot-water bypass pipe to attain the same effects.

In the present embodiment, it is described that the hot-water supply system is provided with the hot-water accumulation pipe 18 and the hot-water accumulation valve 19 to supply hot-water in a normal hot-water supply mode and a hot-water accumulation mode; however, it is possible to apply the present invention to a hot-water supply system without a hot-water accumulation pipe so as to supply hot-water only in the normal hot-water supply mode.

In the present embodiment, it is described that the hot-water supply system is provided with the heat pump as a heating unit to heat the water in the hot-water tank; however, it is acceptable to use other heating unit such as a solar system or the like.

In the present embodiment, when the heating by the hot-water supply apparatus 10 is prohibited to perform the temperature regulation control via mixing, the process of reducing the pressure loss in the hot-water supply apparatus 10 is performed by fully opening the bypass servo valve 14 of the hot-water supply apparatus 10; however, it is possible to attain the effects of the present invention without performing the process.

INDUSTRIAL APPLICABILITY

As described above, according to the hot-water supply system of the present invention, when the hot-water tank unit and the hot-water supply apparatus are connected in series, the pressure loss in the pipeline of the water can be reduced; therefore, the present invention is useful for a hot-water supply system provided with a hot-water tank.

What is claimed is:

1. A hot-water supply system comprising:
a hot-water tank,
a hot-water supply pipe connected to the hot-water tank,
a water supply pipe connected to the hot-water tank and the hot-water supply pipe,
a heating unit configured to heat the water in the hot-water tank,
a water current sensor configured to detect a water current to the water supply pipe,
a hot-water flow regulation valve disposed between a joint location of the hot-water supply pipe to the hot-water tank and a joint location of the hot-water supply pipe to the water supply pipe for regulating an opening degree of the hot-water supply pipe,
a water flow regulation valve disposed between a joint location of the water supply pipe to the hot-water tank and the joint location of the hot-water supply pipe to the water supply pipe for regulating an opening degree of the water supply pipe,
a hot-water storage temperature sensor configured to detect a temperature of the water in the hot-water tank,
a hot-water supply apparatus disposed in the midway of the hot-water supply pipe at a downstream side of the joint location between the hot-water supply pipe and the water supply pipe for heating the water flowing through the hot-water supply pipe,
a hot-water supply temperature setting unit configured to set a desired hot-water supply temperature, and
a temperature regulation control unit configured to perform a temperature regulation control via mixing by prohibiting the heating by the hot-water supply apparatus and regulating a mixing ratio of the hot-water supplied from the hot-water tank to the hot-water supply pipe and the water supplied from the water supply pipe to the hot-water supply pipe by controlling the hot-water flow regulation valve and the water flow regulation valve so as to supply the hot-water having the desired hot-water supply temperature from the hot-water supply pipe when the water current is detected by the water current sensor and the detection temperature by the hot-water storage temperature sensor is higher than a hot-water shortage determination temperature set according to the desired hot-water supply temperature, and to perform a temperature regulation control via heating by permitting the heating by the hot-water supply apparatus so as to supply the hot-water having the desired hot-water supply temperature from the hot-water supply pipe when the water current is detected by the water current sensor and the detection temperature by the hot-water storage temperature sensor is equal to or lower than the hot-water shortage determination temperature,
wherein the hot-water supply system further comprises a mixing temperature sensor disposed at a downstream side close to the joint location between the hot-water supply pipe and the water supply pipe for detecting a temperature of the water supplied from the joint location between the hot-water supply pipe and the water supply pipe to the hot-water supply pipe, and
when the temperature regulation control via heating is initiated, the temperature regulation control unit regulates the mixing ratio by controlling the hot-water flow regulation valve and the water flow regulation valve so as to lower a detection temperature of the mixing temperature sensor from a temperature obtained by subtracting a minimum capacity temperature from the desired hot-water supply temperature by a first predefined temperature over a predefined time, and thereafter opens the hot-water flow regulation valve and the water flow regulation valve to a maximum opening degree, wherein the minimum capacity temperature is a temperature increment of the hot-water in a present flow state when heated by the hot-water supply apparatus with a minimum heating capacity.

2. The hot-water supply system according to claim 1, wherein the predefined time is defined as a time interval in which the hot-water supply system is capable of supplying the hot-water having the desired hot-water supply temperature from the hot-water supply apparatus by increasing a heating capacity of the hot-water supply apparatus following the lowering of the detection temperature of the mixing temperature sensor by the first predefined temperature.

3. The hot-water supply system according to claim 1, wherein
the hot-water supply apparatus is provided with
a heat exchanger disposed in the midway of the hot-water supply pipe,
a hot-water bypass pipe bypassing the heat exchanger to communicate the hot-water supply pipe at a upstream side and a downstream side of the heat exchanger, and
a bypass regulation valve regulating the opening degree of the hot-water bypass pipe; and
the temperature regulation control unit opens the bypass regulation valve to the maximum opening degree when the temperature regulation control via mixing is being performed, and closes the bypass regulation valve when the temperature regulation control via heating is being performed.

4. A hot-water supply system comprising:
a hot-water tank,
a hot-water supply pipe connected to the hot-water tank,
a water supply pipe connected to the hot-water tank and the hot-water supply pipe,
a heating unit configured to heat the water in the hot-water tank,
a water current sensor configured to detect a water current to the water supply pipe,
a hot-water flow regulation valve disposed between a joint location of the hot-water supply pipe to the hot-water tank and a joint location of the hot-water supply pipe to the water supply pipe for regulating an opening degree of the hot-water supply pipe, a water flow regulation valve disposed between a joint location of the water supply pipe to the hot-water tank and the joint location of the hot-water supply pipe to the water supply pipe for regulating an opening degree of the water supply pipe, a hot-water storage temperature sensor configured to detect a temperature of the water in the hot-water tank, a hot-water supply apparatus disposed in the midway of the hot-water supply pipe at a downstream side of the joint location between the hot-water supply pipe and the water supply pipe for heating the water flowing through the hot-water supply pipe, a hot-water supply temperature setting unit configured to set a desired hot-water supply temperature, and a temperature regulation control unit configured to perform a temperature regulation control via mixing by prohibiting the heating by the hot-water supply apparatus and regulating a mixing ratio of the hot-water supplied from the hot-water tank to the hot-water supply pipe and the water supplied from the water supply pipe to the hot-water supply pipe by controlling the hot-water flow regulation valve and the water flow regulation valve so as to supply the hot-water having the desired hot-water supply temperature from the hot-water supply pipe when the water current is detected by the water current sensor and the detection temperature by the hot-water storage temperature sensor is higher than a hot-water shortage determination temperature set according to the desired hot-water supply temperature, and to perform a temperature regulation control via heating by permitting the heating by the hot-water supply apparatus so as to supply the hot-water having the desired hot-water supply temperature from the hot-water supply pipe when the water current is detected by the water current sensor and the detection temperature by the hot-water storage temperature sensor is equal to or lower than the hot-water shortage determination temperature, wherein the hot-water supply system further comprises a mixing temperature sensor disposed at a downstream side close to the joint location between the hot-water supply pipe and the water supply pipe for detecting a temperature of the water supplied from the joint location between the hot-water supply pipe and the water supply pipe to the hot-water supply pipe, when the temperature regulation control unit detects that the detection temperature by the hot-water storage temperature sensor is higher than a hot-water complete shortage determination temperature set lower than the hot-water shortage determination temperature in the temperature regulation control via heating, the temperature regulation control unit regulates the mixing ratio by controlling the hot-water flow regulation valve and the water flow regulation valve so as to make a detection temperature of the mixing temperature sensor equal to a temperature obtained by subtracting a minimum capacity temperature from the desired hot-water supply temperature, wherein the minimum capacity temperature is a temperature increment of the hot-water in a present flow state when heated by the hot-water supply apparatus with a minimum heating capacity; and when the temperature regulation control unit detects that the detection temperature by the hot-water storage temperature sensor is equal to or lower than the hot-water complete shortage determination temperature, the temperature regulation control unit opens the hot-water flow regulation valve and the water flow regulation valve to the maximum opening degree.

5. The hot-water supply system according to claim 4 is further provided with an inflow water temperature sensor for detecting a temperature of water supplied from the water supply pipe to the hot-water supply pipe, and the hot-water complete shortage determination temperature is defined as a temperature higher than a detection temperature by the inflow water temperature sensor or a temperature higher than the detection temperature by the inflow water temperature sensor by a second predefined temperature.

6. The hot-water supply system according to claim 4, wherein the hot-water supply apparatus is provided with a heat exchanger disposed in the midway of the hot-water supply pipe, a hot-water bypass pipe bypassing the heat exchanger to communicate the hot-water supply pipe at a upstream side and a downstream side of the heat exchanger, and a bypass regulation valve regulating the opening degree of the hot-water bypass pipe; and the temperature regulation control unit opens the bypass regulation valve to the maximum opening degree when the temperature regulation control via mixing is being performed, and closes the bypass regulation valve when the temperature regulation control via heating is being performed.

* * * * *